May 1, 1956

E. R. HIBBARD 2,743,678

METHOD OF AND SYSTEM FOR THE REMOTE
CONTROL OF MODEL RAILROADS

Filed July 11, 1950

INVENTOR.
Earl Roger Hibbard
BY
Oliver D. Olson
His Agent

May 1, 1956

E. R. HIBBARD 2,743,678

METHOD OF AND SYSTEM FOR THE REMOTE
CONTROL OF MODEL RAILROADS

Filed July 11, 1950

INVENTOR.
Earl Roger Hibbard
BY
His Agent

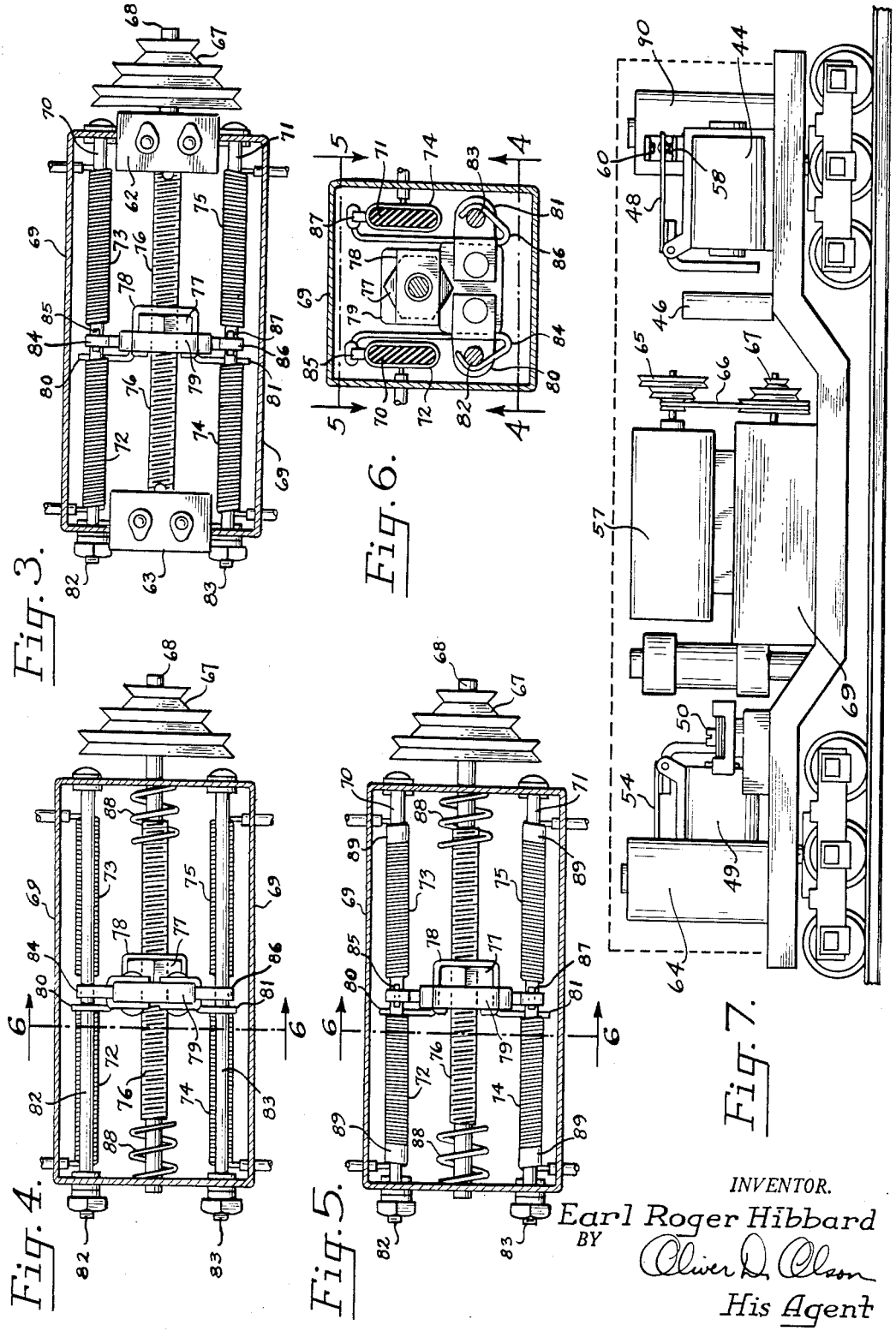

United States Patent Office 2,743,678
Patented May 1, 1956

2,743,678

METHOD OF AND SYSTEM FOR THE REMOTE CONTROL OF MODEL RAILROADS

Earl Roger Hibbard, Portland, Oreg., assignor of one-half to Alvin D. Wert, Portland, Oreg.

Application July 11, 1950, Serial No. 173,214

7 Claims. (Cl. 104—151)

This invention pertains to electrical distributing systems, and relates particularly to a novel method of and system for controlling the operation of model railroads and the like from a remote position through the simultaneous use of direct and alternating currents.

It is a principal object of the present invention to provide a system of remote control in which an alternating current of selected frequency is employed to operate means for controlling the magnitude and polarity of a drive current utilized to propel model railroads and the like.

Another important object of this invention is the provision of a novel resistance unit by which to vary at will the magnitude and polarity of a current supply.

A further important object of this invention is to provide a novel oscillator circuit which accommodates ready selection of any one of a series of alternating currents and which affords accurate control of the power output thereof.

A further important object of this invention is the provision of a novel method of controlling the operation of an electric motor from a remote position by means of both alternating and direct currents.

A still further object is the provision of a method and means for controlling from a remote position the operation of the engine, lights, couplings and other devices employed on model railroads.

These and other objects and advantages of the present invention will appear from the following detailed description taken in connection with the accompanying drawings, in which:

Figure 3 is a plan view of a resistance unit embodying features of the present invention;

Figure 4 is a bottom plan view of a modified resistance unit embodying features of this invention as taken along the line 4—4 in Figure 6;

Figure 5 is a top plan view of the resistance unit shown in Figure 4 as taken along the line 5—5 in Figure 6;

Figure 6 is a sectional view of the resistance unit taken along lines 6—6 in Figures 4 and 5;

Figure 7 is a side elevation of a model railroad car showing the manner in which apparatus forming part of the system of the present invention may be mounted thereon;

Stated broadly, this invention involves the use of a pair of selected frequencies of alternating current in operating a control motor which moves the contacts of a resistance unit to vary the magnitude and polarity of the direct current supply which operates the drive motor of a model railroad.

Figure 1:
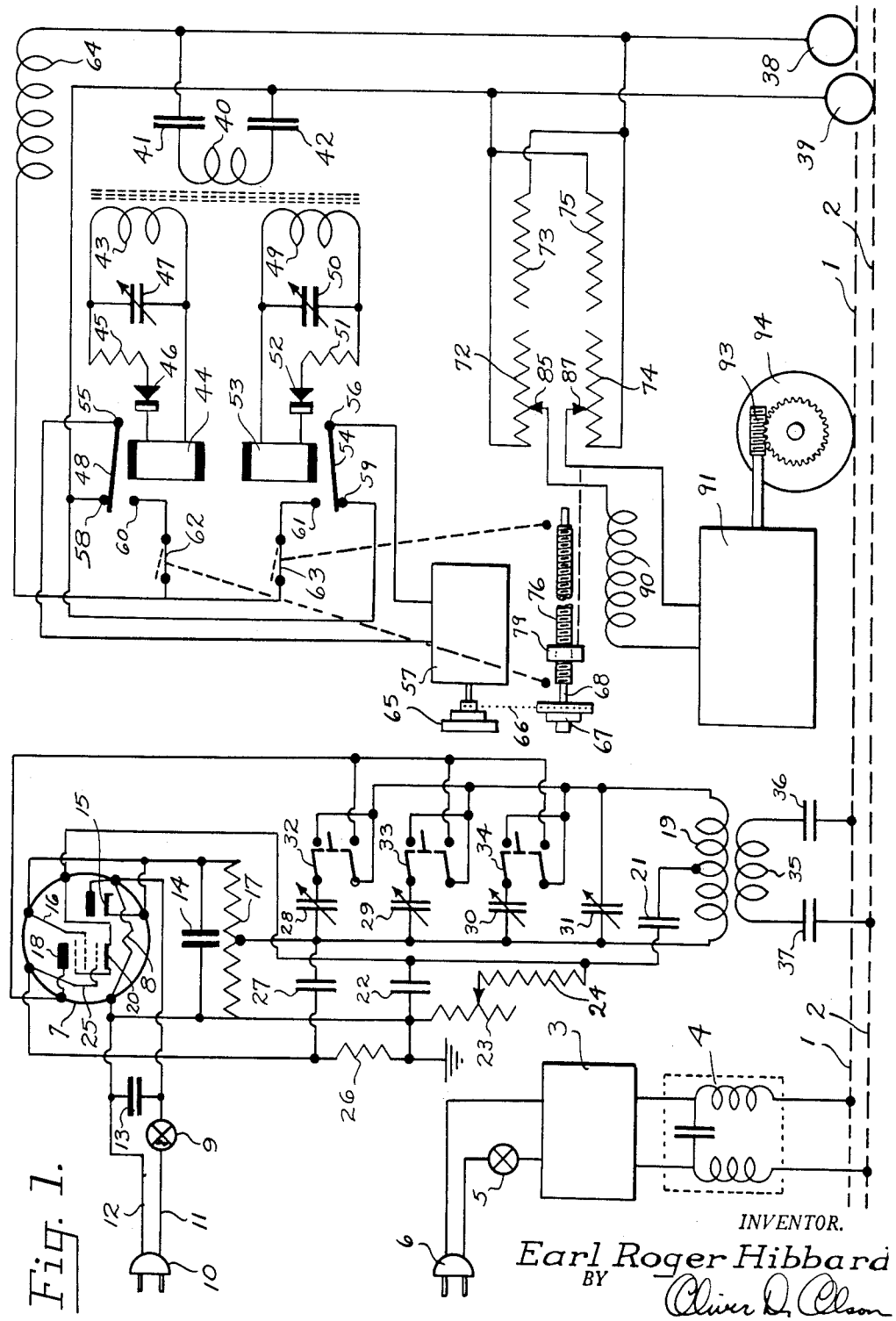
Figure 1 is a diagrammatic view of an electrical system embodying the features of the present invention and showing the same applied for use in controlling the operation of a model railroad.

Referring to Figure 1 of the drawings, the model railroad cars travel upon the pair of metal rails 1 and 2, shown as dotted lines. Direct current of about 12 volts is supplied to the rails by rectifier 3 through the radio frequency choke 4 provided to prevent the direct current supply from shorting the high frequency component of the control system described hereinafter across the rails 1 and 2 and to keep said high frequency out of the power supply. Rectifier 3 is connected through switch 5 and plug 6 to the conventional A. C. supply of about 117 volts.

The alternating current utilized may be of any desired type and frequency, it being preferred to use radio frequency. Radio frequency signals are developed in any conventional manner, the devices illustrated in the drawings being preferred. In Figure 1 the oscillator circuit employs in one tube envelop 7 a combination half-wave rectifier and beam power amplifier. The heater element 8 is operated by switch 9 from the usual alternating current supply through plug 10 and lines 11, 12. Filter condenser 13 is placed across the input lines 11, 12 in conventional manner to keep the high frequency out of said power lines.

Filter condenser 14 is placed between the cathode 15 of the rectifier section of tube 7 and ground to smooth out the rectified direct current. Cathode 15 is also connected to the screen grid 16 of the power amplifier. Resistor 17 connecting the cathode 15 and screen grid 16 to ground functions as voltage divider to maintain the voltage of plate 18 below the voltage of said screen grid. One end of coil 19 is connected to resistor 17 intermediate the ends of the latter. The cathode 20 of the amplifier is connected through coupling condenser 21 to an intermediate turn of coil 19. Bypass condenser 22 connects said cathode to ground. Variable resistor 23 is connected at one end to ground, while the moving contact thereof is connected through resistor 24 to cathode 20. Resistor 23 functions as a cathode bias resistor, providing negative potential on the control grid 25 with respect to said cathode. Resistor 24 provides the correct bias for maximum output when resistor 23 is at its position of greatest negative bias. The control grid 25 is connected through grid leak resistor 26 to ground and through coupling condenser 27 to the coil 19.

Placed in parallel with each other and with coil 19 are a plurality of variable condensers 28, 29, 30 and 31. Condensers 28, 29 and 30 are each placed removably in said parallel circuit by means of manual switches 32, 33 and 34, respectively. Each of said switches also removably connects the parallel combination of coil 19 and the corresponding variable condenser to the plate 18 of the amplifier, as shown. Each parallel combination of coil 19 and variable condenser constitutes a tuned circuit and produces a particular frequency of oscillation which is amplified and utilized to control the operation of the model railroad as described in detail hereinafter. Thus, as many variable condensers as is desired may be placed in parallel with coil 19 to produce any required number of frequencies.

The alternating current of selected frequency is picked up by the coil winding 35 and transmitted through coupling condensers 36, 37 to the metal rails 1 and 2, respectively. The coupling condensers 36, 37 function to protect the winding 35 from the direct current applied to said rails.

The high frequency signal generated by the oscillator is transmitted by rails 1 and 2 to a pair of metal wheels 38, 39 of a railroad car in which the control mechanism now to be described is housed. The said metal wheels are connected to opposite ends of the primary winding 40 of an input transformer through coupling condensers 41 and 42, respectively. The secondary winding 43 is connected at one end to relay coil 44 and at the opposite end through resistor 45 and crystal rectifier 46 to said relay coil 44. Variable condenser 47 is placed in parallel with the secondary winding 43 to form a tuned circuit therewith. Resistor 45 functions to decrease the loading effect of relay coil 44 upon said tuned circuit 43, 47. The high frequency signal picked up by the tuned circuit is thus rectified and the resulting direct current is employed to energize relay coil 44 and actuate switch 48.

A secondary winding 49, variable condenser 50, resistor 51 and crystal rectifier 52 is connected to relay coil 53 in manner similar to the circuit just described, to actuate switch 54. The common contacts 55 and 56 of switches 48 and 54, respectively, are connected to control motor 57. Contacts 58 and 59 of switches 48 and 54, respectively, are connected through wheel 39 to rail 2, while contacts 60 and 61 of said switches are connected to line 1 through micro-switches 62 and 63, respectively, choke coil 64 and wheel 38. Switches 48 and 54 are shown in Figure 1 to be in their normal, open position.

The control motor 57 is provided with a pulley 65 which is connected through belt 66 to pulley 67 mounted at one end of a shaft 68. Referring to Figures 1, 3, 4, 5 and 6 of the drawings, shaft 68 is mounted for axial rotation centrally of a rectangular frame 69. Secured to said frame on opposite sides of shaft 68 and extending parallel with the latter are electrically non-conductive bars 70 and 71. A pair of resistances 72 and 73 are provided on bar 70 in longitudinally spaced relation with each other, while a second pair of resistances 74 and 75 are similarly provided on bar 71. Resistances 72 and 75 are adapted to be connected through wheel 39 to rail 2 and resistances 73 and 74 are adapted to be connected through wheel 38 to rail 1, as shown in Figure 1.

Shaft 68 is formed with threads 76 intermediate its ends to receive a nut 77 which is secured against rotation by clamp 78 mounted upon an electrically non-conducting carrier 79. The carrier supports a pair of guides 80 and 81 which project laterally from opposite sides thereof. A hole provided in each of said guides receives an electrically conductive rod 82 and 83, respectively, which extends between but is insulated electrically from the frame 69 adjacent the bars 70 and 71. A metal clip 84 secured to guide 80 is bent at one end to frictionally engage rod 82. The opposite end of clip 84 carries a sliding contact 85 arranged to engage the resistances 72 and 73. In similar manner, metal clip 86 engages rod 83 at one end and carries a sliding contact 87 at the opposite end for engagement with resistances 74 and 75. Thus, as shaft 68 is rotated, the carrier 79 is moved longitudinally thereof to vary the position of the contacts on said resistances, as explained in detail hereinafter.

The resistance unit illustrated in Figure 3 of the drawings differs from the unit shown in Figures 4, 5 and 6 in the following details: In Figure 3 the micro switches 62 and 63 shown in Figure 1 are mounted at opposite ends of the threaded shaft 68. Thus, when the carrier 79 reaches either end of shaft 68 it contacts one of the normally closed switches 62, 63 and opens the circuit to control motor 57. It is to be noted that the switches operate independently of each other, i. e. the opening of one switch prevents the rotation of the control motor in one direction only. The reverse rotation is obtained by closing the other of said switches.

In Figures 4, 5 and 6 of the drawings the switches 62 and 63 shown in Figure 1 are not provided. Instead, a coil spring 88 projects inwardly from each end of frame 69 around shaft 68. Thus, when the carrier nut 77 reaches the end of the threaded portion of shaft 68, the latter continues to rotate without changing the position of the contacts 85, 87 on the resistances until energy to motor 57 is cut off by the release of relay coil 44 or 53. When shaft 68 begins to rotate in the opposite direction, the coil spring 88 urges the nut 77 into engagement with the threads 76. In this modification it is preferred to provide a smooth conducting surface such as a brass or silver band 89 adjacent the outer ends of the resistances to insure positive engagement of the contacts 85, 87.

Referring now to Figure 1, contact 85 is connected through choke coil 90 to the locomotive drive engine 91 while contact 87 is connected directly to said engine. The engine is shown in the drawing as an electric motor which operates the drive wheels 94 by means of gears 93. It is to be understood that the locomotive engine may be of any type desired, the operation of which is capable of being controlled by electrical means actuated by the control unit previously described, as explained in detail hereinafter.

In Figure 1 any desired frequency of oscillation is obtained by selecting the proper tuned circuit, as explained hereinbefore. For example, the tuned circuit comprising coil 19 and variable condenser 28 may provide a frequency of oscillation to which the tuned circuit comprising coil 43 and variable condenser 47 is responsive. The tuned circuits comprising coil 19 and condenser 29 and coil 49 and condenser 51 may cooperate in similar manner. It is apparent that but one cooperating pair of tuned circuits may be utilized at one time since coil 19 is common to all the variable condensers employed to form tuned circuits of diverse frequency responses.

Figure 2:
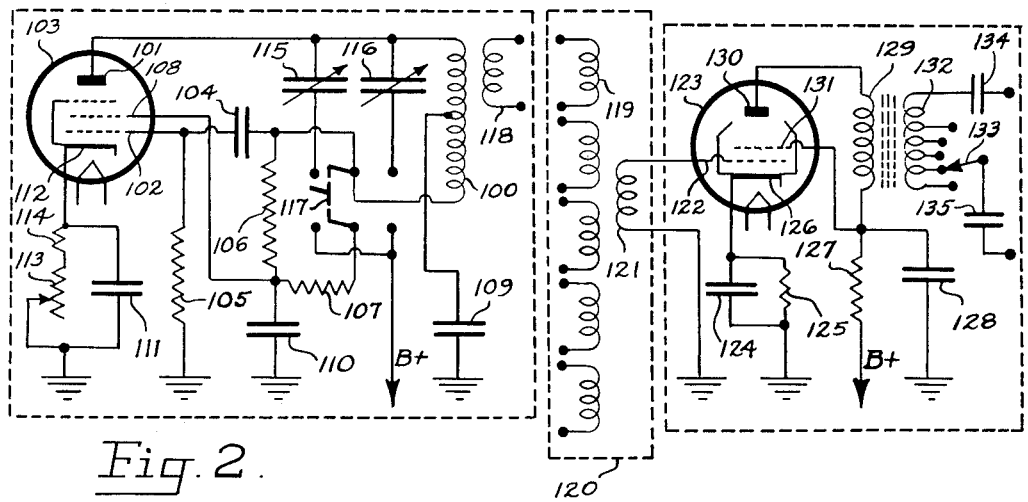
Figure 2 is a diagrammatic view of a modified system for producing radio frequencies utilized in controlling the operation of model railroads in accordance with this invention.

A modified system of producing high frequency oscillations is shown in Figure 2. The oscillator includes coil 100 connected between the plate 101 and control grid 102 of tube 103 through coupling condenser 104. The usual grid leak resistor 105, plate decoupling resistor 106 and the decoupling resistor 107 for screen grid 108 are provided as shown. Coil 100 is connected intermediate its ends to ground through coupling condenser 109. Condenser 110 functions to keep the high frequency out of the power supply. Bypass condenser 111 connects the cathode 112 to ground. Variable resistor 113 and fixed resistor 114 function in the same manner as resistors 23 and 24, respectively, in providing the proper negative bias on control grid 102 with respect to the cathode 112.

Variable condensers 115 and 116 are each arranged removably in parallel with coil 100 by means of switch 117 whereby to provide two tuned circuits. For example, coil 100 and condenser 115 may cooperate with the tuned circuit comprising coil 43 and condenser 47, while coil 100 and condenser 116 may cooperate with coil 49 and condenser 50.

The output of coil 100 is coupled through secondary coil 118 to coil 119 of transformer 120. The latter is provided with a plurality of coils, each of which is proportioned and arranged for coupling to a separate oscillator. In this manner a plurality of frequencies may be utilized at one time to permit simultaneous operation of a number of trains or other devices, as explained in detail hereinafter. The plurality of coils, including coil 119, are coupled by coil 121 to the control grid 122 of the power amplifier tube 123. The usual bypass condenser 124 and bias resistor 125 for cathode 126, and decoupling resistor 127 and condenser 128 are provided. Output transformer 129 is connected between the plate 130 and screen grid 131. The secondary winding 132 is provided with a plurality of taps engaged selectively by switch 133 whereby to permit proper matching of loads. Said secondary winding is connected through coupling condensers 134 and 135 to the metal rails 1 and 2 in manner similar to the construction described hereinbefore.

Figure 8:
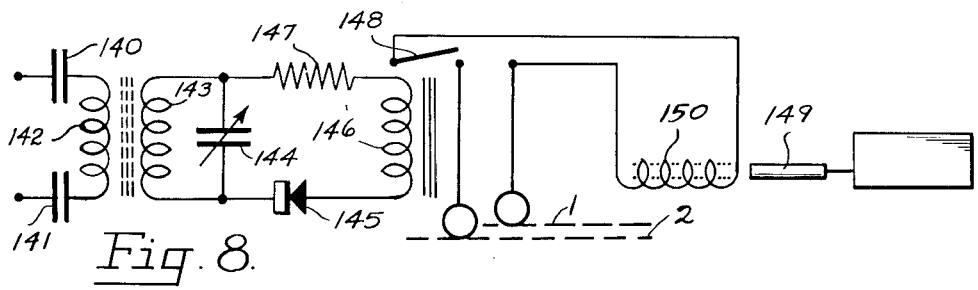
Figure 8 is a diagrammatic view showing the manner in which a train coupling device may be operated from a remote position in accordance with the present invention.
Figure 9:
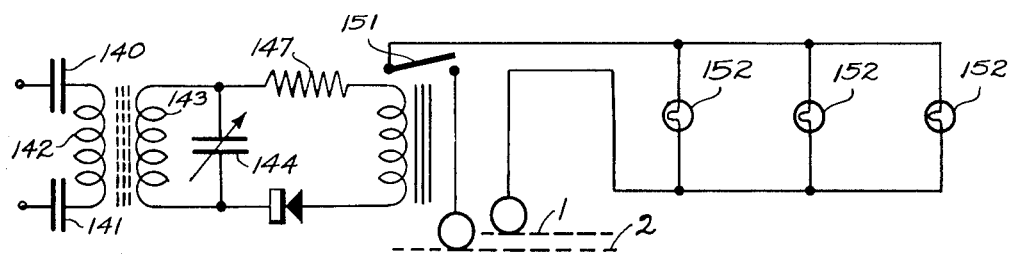
Figure 9 is a diagrammatic view showing the manner in which electric lights may be operated from a remote position in accordance with this invention.

The pair of circuits 43 to 47, inclusive and 49 to 53, inclusive have been shown hereinbefore as applied to the control of a locomotive drive engine 91. Similar circuits may be employed to operate other devices such as mechanisms for coupling and decoupling adjacent cars and for operating electric lights, as illustrated in Figures 8 and 9, respectively. In Figure 8 the high frequency is picked up from the tracks through the metal wheels and transmitted through coupling condensers 140 and 141 and coil 142 to the tuned circuit comprising coil 143 and variable condenser 144. The current is converted to direct current by rectifier 145 for purposes of actuating relay coil 146. Resistor 147 functions in the same manner as resistors 45 and 51 decrease the loading effect of coil 146 upon the tuned circuit 143, 144. When relay coil 146 is energized, switch 148 is closed and direct current from tracks 1 and 2 actuates the armature 149 of solenoid 150 to operate a conventional coupling device.

In Figure 9 the identical circuit arrangement functions to operate switch 151. When the switch is closed, direct current from tracks 1 and 2 is utilized to energize one or more electric lamps 152 mounted upon the railroad cars. It will be apparent to those skilled in the art that the circuit comprising elements 140 to 148, inclusive, may be utilized to operate track switching devices, signal lights and many other components of model railroads.

Figure 10:
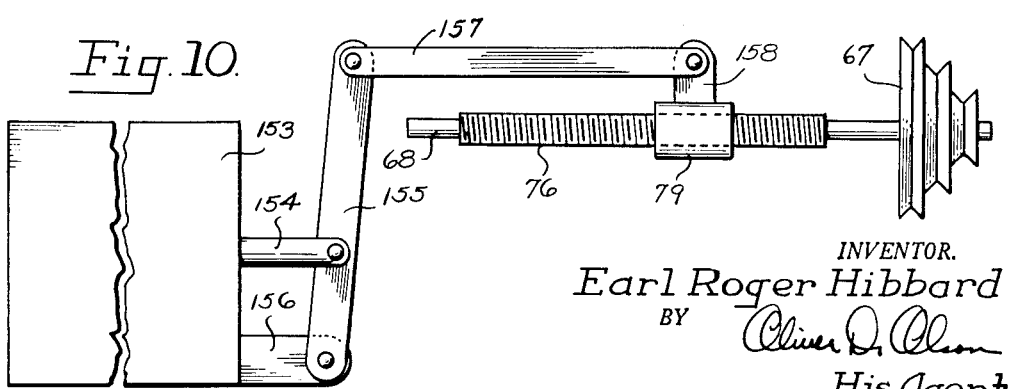
Figure 10 is a schematic view illustrating the manner in which the present invention may be utilized to control the operation of an engine or motor not powered by electrical energy.

The foregoing description has been based upon the operation of an electric drive motor 91. In Figure 10 is shown a modification of the system described hereinbefore, in which is provided means for operating a drive motor or engine of the reciprocating or other type not powered by electrical energy. The drive motor, shown generally at 153, is provided with a rod 154 which is connected at one end to the control mechanism of the engine. Said control may be a throttle, a clutch, a transmission, or other device. The rod 154 may be connected pivotally at its opposite end to link 155 pivotally secured at one end to bracket 156 and at the opposite end to arm 157. The latter is secured pivotally through bracket 158 to the carrier 79 which is mounted upon the threaded shaft 68 as previously described. In this manner, control of speed and direction of engine 153 is afforded by the selective operation of control motor 57, whereby movement of the carrier 79 along the shaft 68 results in the moving of control rod 154.

In the following description of the operation of the system described hereinbefore and illustrated in Figures 1 to 7, inclusive, let it be assumed that relay coil 44 regulates the forward motion of the locomotive and that relay coil 53 regulates the rearward motion thereof. Assume further that the tuned circuit 19, 28 and the tuned circuit 43, 47 are both responsive to an alternating current of $x$ frequency, while tuned circuits 19, 29 and 49, 50 are both responsive to an alternating current of $y$ frequency.

With the system arranged as shown in Figure 1 of the drawings, the operator closes switch 32. The alternating current of $x$ frequency thus produced in the oscillator is transmitted along the metal rails 1 and 2, through the wheels 38, 39 of the car carrying the control equipment, and thence to coil 40. The tuned circuit 43, 47 responds to the $x$ frequency while the tuned circuit 49, 50 does not. The $x$ frequency signal is thus converted to direct current by rectifier 46 and relay coil 44 becomes energized. Switch 48 is drawn into engagement with contact 60. Assuming that micro-switch 62 is closed (by virtue of contact carrier 79 being at some position removed from engagement therewith), direct current flows from rails 1 and 2 through control motor 57 in such manner as to cause the latter, and hence the threaded shaft 68, to rotate in the direction which moves the contacts 85, 87 to the left as viewed in Figure 1.

As shaft 68 continues to rotate in the direction established by relay coil 44, contacts 85, 87 move to the left along resistors 72 and 74, respectively. The magnitude of the direct current supplied from rails 1, 2 thereby increases, and progressively greater forward speed of drive engine 91 results. When carrier 79 reaches the extreme left end of shaft 68 and the engine 91 is traveling at maximum speed, said carrier engages micro-switch 62 and opens the circuit to control motor 57. Although the rotation of shaft 68 is thereby stopped, the drive engine 91 continues to rotate at maximum forward speed. The same result is obtained with the resistance unit shown in Figures 4, 5 and 6, although control motor 57 and shaft 68 continue to rotate since micro switches are not provided.

It is apparent that switch 32 may be opened when contacts 85, 87 are situated at any desired position on the resistance unit to permit movement of the locomotive at any selected speed. Thus, the usual operation will be to close switch 32 until the desired speed is obtained, and then to open said switch to maintain the selected speed.

Assume now that the operator wishes to reverse the direction of movement of the train. Accordingly, switch 32 is opened and switch 33 is closed. The $y$ frequency thus generated by tuned circuit 19, 29 is converted to direct current by rectifier 52 located in the circuit which includes the elements 49, 50 tuned to said $y$ frequency. Relay coil 53 becomes energized, whereby switch 54 moves to contact 61. Direct current from the rails 1, 2 flows to control motor 57 in the reverse manner previously described to cause the contacts 85, 87 to move toward the right end of shaft 68.

As the contacts 85, 87 move toward the right from the left end of resistors 72 and 74, progressively decreasing power is supplied to drive engine 91. Accordingly, the forward speed of the latter decreases to zero as the contacts move toward and into the non-conducting area between the resistances 72, 73 and 74, 75, respectively.

As the contacts continue to move toward the right, they engage resistors 73 and 75, respectively, which are connected to the metal rails in the opposite manner of resistors 72 and 74. Thus, the polarity of direct current supplied to engine 91 through contacts 85, 87 is reversed as the latter move from resistors 72, 74 to resistors 73, 75, respectively. The engine 91 begins to rotate in reverse direction, the speed of which increases as the said contacts move toward the right. When carrier 79 reaches the extreme right end of shaft 68 it contacts micro switch 63 which opens to deenergize the control motor 57. At this position the locomotive is traveling at maximum reverse speed. With the resistance unit shown in Figures 4, 5 and 6, the control motor and shaft 68 continue to rotate, as described hereinbefore.

Switch 34 may be employed to generate an alternating current of a frequency which is receivable, for example, by the tuned circuit 143, 144 shown in Figure 8 for purposes of coupling and decoupling adjacent cars, as previously explained. Other switches and corresponding variable condensers may be placed in parallel with coil 19 to operate the light circuit shown in Figure 9 and other devices which will be recognized by those skilled in the art.

Alternatively, a plurality of oscillators of the type shown in Figure 2 of the drawings may be employed to control the movements of several locomotives and to operate diverse types of auxiliary equipment.

It will be apparent to those skilled in the art that various changes may be made in the systems described hereinbefore and illustrated in the drawings without departing from the scope and spirit of the present invention. For example, the control motor 57 and/or the drive motor 91 may be of the types designed to operate on alternating current. It is believed apparent that such motors may be utilized by substituting the current of proper frequency for the direct current supply described hereinbefore and by making the necessary but elementary changes in the electrical distributing system, in accordance with practice well-known by those skilled in the art. As another example, the alternating and direct currents may be supplied to the railroad system through overhead or other types of electrical conductors communicating with the said system instead of through the rails 1 and 2 as previously described. In a further example, the resistance units shown in Figures 3, 4, 5 and 6 may be designed in the shape of a circle comprising four resistance segments with the contacts moving from a central shaft which is rotatable through 180° by the control motor to provide the operation described hereinbefore. It is to be understood, therefore, that the foregoing description is merely illustrative of the invention and is not to be considered in a limiting sense.

Having now described my invention and the manner in which the same may be used, what I claim as new and desire to secure by Letters Patent is:

1. A system for controlling the operation of an electric reversible device from a remote position, comprising a source of currents of diverse frequency characteristics, a pair of polarity reversing switching means connecting said electric device to one of said currents in opposite polarities, electrically operated switch-actuating means for each switching means, a pair of tuned circuits each connected to one of said switch-actuating means, each tuned circuit being responsive to a different frequency of said current, means in the circuit of each switch-actuating means for rendering the latter responsive to said current, and means releasably connecting each tuned circuit to its corresponding current, whereby selectively to actuate said pair of switching means for controlling the reversible operation of said device.

2. A system for controlling the operation of an electric reversible engine from a remote position, comprising a source of currents of diverse frequency characteristics, two pairs of variable resistance means connected in opposite polarities between the source of one of said currents and said engine, an electric reversible motor for operating said variable resistance means, a pair of switching means connecting said electric motor to one of said currents in opposite polarities, electrically operated switch-actuating means for each switching means, a turned circuit connected to each of said switch-actuating means, each tuned circuit being responsive to a different frequency of said current, means in the circuit of each switch-actuating means for rendering the latter responsive to said current, and means releasably connecting each tuned circuit to its corresponding current, whereby selectively to actuate said pair of switching means for controllng the reversible operation of said motor and engine.

3. A system for controlling the operation of a direct current reversible engine from a remote position, comprising a source of direct current and a source of alternating currents of diverse frequency characteristics, variable resistance means connected in opposite polarities between the source of direct current and said engine, a direct current electric reversible motor for operating said variable resistance means, a pair of switching means connecting said electric motor to the direct current in opposite polarities, electrically operated swtch-actuating means for each switching means, each switch-actuating means being responsive to a different frequency of alternating current, and means releasably connecting each switch-actuating means to its corresponding alternating current whereby selectively to actuate said pair of switching means for controlling the reversible operation of said motor and engine.

4. A system for controlling the operation of an electric model railroad reversible engine from a remote position, comprising, in combination with electrical conductors communicating with said railroad, a source of currents of diverse frequency characteristics connected to said electrical conductors, variable resistance means connected in opposite polarities between the source of one of said currents and said engine, an electric reversible motor for operating said variable resistance means, a pair of switching means connecting said electric motor to one of said currents in opposite polarties, electrically operated switch-actuating means for each switching means, each of said switch-actuating means being responsive to a different frequency of said current, and means releasably connecting each switch-actuating means to its corresponding current, whereby selectively to actuate said pair of switching means for controlling the reversible operation of said motor and engine.

5. A system for controlling the operation of a model railroad direct current reversible engine from a remote position, comprising, in combination with electrical conductors communicating with said railroad, a source of direct current and a source of alternating currents of diverse frequency characteristics connected to said electrical conductors, two pairs of variable resistance means connected in opposite polarities between the source of direct current and said engine, a direct current electric reversible motor for operating said variable resistance means, a pair of switching means connecting said electric motor to the direct current in opposite polarities, electrically operated switch-actuating means for each switching means, a tuned circuit connected to each of said switch-actuating means, each circuit being responsive to a different frequency of said alternating current, and means releasably connecting each tuned circuit to its corresponding current, whereby selectively to actuate said pair of switching means for controlling the operation of said reversible motor and engine.

6. A system for controlling the operation of a reversible electric engine from a remote position, comprising a source of currents of diverse frequency characteristics, polarity reversing means including variable resistance means connecting the engine to the source of one of the currents in opposite polarities, an electric reversible motor for operating said variable resistance means, a pair of polarity reversing switching means connecting said electric motor to the source of one of the currents in opposite polarities, each of the switching means having a normally inoperative position, the operative position of one switching means connecting the motor to said current through the inoperative position of the other switching means, electrically operated switch-actuating means for each of the switching means, and a tuned circuit connected to each of the switch-actuating means and each responsive to a different frequency of said current, whereby selective transmission of one of the latter currents actuates the corresponding switching means and controls the operation of the motor and engine.

7. A system for controlling the operation of an electric reversible device from a remote position, comprising a source of currents of diverse frequency characteristics, a pair of polarity reversing switching means connecting said electric device to one of said currents in opposite polarities, electrically operated switch-actuating means for each of said switching means, each switch-actuating means being responsive to a different frequency of said current, and means releasably connecting each switch-actuating means to its corresponding current, whereby selectively to actuate said pair of switching means for controlling the reversible operation of said device.

References Cited in the file of this patent

UNITED STATES PATENTS

| | | |
|---|---|---|
| 1,277,499 | Stevens | Sept. 3, 1918 |
| 1,318,620 | Stevens et al. | Oct. 14, 1919 |
| 1,414,709 | Reisbach | May 2, 1922 |
| 1,569,233 | Morton | Jan. 12, 1926 |
| 1,853,798 | Brownell | Apr. 12, 1932 |
| 2,070,590 | Goldsmith | Feb. 16, 1937 |

(Other references on following page)

UNITED STATES PATENTS

| | | |
|---|---|---|
| 2,192,205 | Siemans | Mar. 5, 1940 |
| 2,283,741 | Lennox | May 19, 1942 |
| 2,380,868 | Peterson | July 31, 1945 |
| 2,513,760 | Toulon | July 4, 1950 |
| 2,521,240 | Milne | Sept. 5, 1950 |
| 2,622,542 | Bonanno | Dec. 23, 1952 |

OTHER REFERENCES

"Electronic Toy Train Controls," by J. L. Bonanno, pages 94, 95 and 96, published in February 1947, "Electronics."